(12) United States Patent
Basu et al.

(10) Patent No.: US 7,420,987 B1
(45) Date of Patent: Sep. 2, 2008

(54) ARBITER FOR MULTIPLE MUTUALLY EXCLUSIVE VECTORS

(75) Inventors: Debashis Basu, San Jose, CA (US); Edwin Su, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1133 days.

(21) Appl. No.: 10/202,394

(22) Filed: Jul. 25, 2002

Related U.S. Application Data

(60) Provisional application No. 60/348,647, filed on Jan. 17, 2002.

(51) Int. Cl.
*H04J 3/02* (2006.01)
(52) U.S. Cl. .................................. 370/462; 370/413
(58) Field of Classification Search ................... None
See application file for complete search history.

(56) References Cited

U.S. PATENT DOCUMENTS

| | | | | |
|---|---|---|---|---|
| 5,502,719 | A * | 3/1996 | Grant et al. ................. 370/412 |
| 5,790,546 | A * | 8/1998 | Dobbins et al. ............. 370/400 |
| 6,233,246 | B1 * | 5/2001 | Hareski et al. .............. 370/422 |
| 6,667,984 | B1 * | 12/2003 | Chao et al. .................. 370/414 |
| 6,778,546 | B1 * | 8/2004 | Epps et al. .................. 370/413 |
| 6,810,426 | B2 * | 10/2004 | Mysore et al. ............. 709/234 |
| 6,917,620 | B1 * | 7/2005 | Sindhu et al. .............. 370/401 |
| 6,963,576 | B1 * | 11/2005 | Lee ............................ 370/411 |
| 7,020,146 | B2 * | 3/2006 | Smith et al. ................ 370/401 |
| 7,120,113 | B1 * | 10/2006 | Zhang et al. ............... 370/229 |
| 2003/0081624 | A1 * | 5/2003 | Aggarwal et al. .......... 370/412 |
| 2007/0183421 | A1 * | 8/2007 | Terrell et al. .............. 370/389 |

* cited by examiner

*Primary Examiner*—Phirin Sam
(74) *Attorney, Agent, or Firm*—Harrity Snyder, LLP

(57) ABSTRACT

An arbiter performs arbitration over a plurality of queues and provides data to a plurality of mutually exclusive destinations using combination logic that logically combines a plurality of mutually exclusive vectors into a combination vector. Each of the mutually exclusive vectors corresponds to one of the plurality of mutually exclusive destinations. A number of vector arbiters perform arbitration on each mutually exclusive vector to select a position within the mutually exclusive vector. A combination arbiter performs arbitration on the combination vector to determine a position within the combination vector, which corresponds to the next queue to be serviced. A comparison element compares the position within a mutually exclusive vector and the position within the combination vector to determine the destination of the data within the next queue to be serviced.

20 Claims, 7 Drawing Sheets

ARBITER FOR MULTIPLE MUTUALLY EXCLUSIVE VECTORS

RELATED APPLICATION

This application claims priority under 35 U.S.C. § 119 based on U.S. Provisional Application Ser. No. 60/348,647, filed Jan. 17, 2002, the disclosure of which is incorporated herein by reference.

BACKGROUND OF THE INVENTION

1. Field of the Invention

The present invention relates generally to arbitration routing systems and, more particularly, to arbitration of mutually exclusive resources.

2. Description of Related Art

Network devices, such as routers, relay data through a network from a source to a destination. The data may be in the form of packets. Typically, the network devices include one or more arbitration subsystems to control data flow among various queues and/or buffers (hereinafter "queues") or other resources.

FIG. 1 is a diagram of an arbitration subsystem 100 that routes data to a number of different queues. Arbitration subsystem 100 may include a number of first-in-first-out (FIFO) queues 110, an arbiter 120, a first destination queue 130, a second destination queue 140, and a third destination queue 150. The subsystem may include fewer than (e.g., two) or more than (e.g., four or more) the three destination queues 130-150. FIFO queues 110 may receive data from a number (e.g., 256) of different streams (not shown). Arbiter 120 may be configured to perform arbitration among FIFO queues 110 and send the chosen data to one of destination queues 130-150. Typically, arbiter 120 performs a certain type of arbitration (e.g., round robin) to pick one FIFO queue 110 and then routes the data in the FIFO queue based on some criteria (e.g., packet size of the data). Other criteria are possible for the routing function of the arbiter 120.

For example, in FIG. 1, the arbiter 120 may send packets larger than a first threshold to the first destination queue 130. The arbiter 120 may send packets smaller than a second threshold (that is smaller than the first threshold) to the third destination queue 150 and send packets smaller than the first threshold but larger than the second threshold to the second destination queue 140. Because each piece of data (e.g., packet) in the FIFO queues 110 may be sent to only one of the destination queues 130-150, the data contained in FIFO queues 110 may be viewed as three mutually exclusive vectors, each corresponding to one of the three destination queues 130-150. Each bit in a particular vector corresponds to a FIFO queue 110, and the bit may be set to "1" if the data waiting for servicing in the FIFO queue 110 is destined for the queue (e.g., first destination queue 130) corresponding to that particular vector. Use of such mutually exclusive vectors enables the arbiter 120 to perform the routing of data after performing arbitration.

FIG. 2 illustrates two such mutually exclusive vectors 210 and 220, for ease of explanation. The position of the last FIFO queue serviced by the arbiter 120 is denoted as X. The position of the next queue to service in vector 210 is denoted by A. The position of the next queue to service in vector 220 is denoted by B. The arbiter 120 may determine which of positions A and B to service next in accordance with, for example, a round-robin scheme. In such a round-robin scheme, the next queue may be the closest to the right of position X. However, difficulties arise because the positions of the vectors 210 and 220 "wrap" around when the end of the vector is reached. Hence, the arbiter 120 cannot simply choose, for example, the larger-numbered of positions A and B as the closest position to position X.

FIG. 3 illustrates an implementation of the arbiter 120 that performs round robin arbitration on the two mutually exclusive vectors in FIG. 2. The arbiter 120 may include a first vector arbiter 310, a second vector arbiter 320, three subtracting elements 330, and a logic block 340. The first vector arbiter 310 may perform round robin arbitration on the first vector 210 to identify position A within the vector, and the second vector arbiter 310 may perform round robin arbitration on the second vector 220 to identify position B within the vector. The three subtracting elements 330 may perform A-X, A-B, and B-X to produce three positional differences. The logic 340 may be configured to determine the position Y of the next queue to be serviced based on the three positional differences. The third positional difference, A-B, is required to determine which of A and B is directionally closer to X, the last queue serviced.

FIG. 4 illustrates an implementation of the arbiter 120 that performs round robin arbitration on three mutually exclusive vectors. The arbiter 120 may include a first vector arbiter 410, a second vector arbiter 420, a third vector arbiter 430, six subtracting elements 440, and a logic block 450. The elements in FIG. 4 operate similarly to the corresponding elements in FIG. 3, and will not be further described, with the exception of the subtracting elements 440. When the number of mutually exclusive vectors increases to three, six subtracting elements 440 are needed to determine which of positions A, B, and C is directionally closer to the last queue X. The addition of the third vector necessitates the three additional subtracting elements to determine C-X, B-C, and C-A. The logic block 450 decides among the six positional differences produced by the subtracting elements 440 and will be much more complex than the logic block 340 due to the addition of the third vector 230.

The added complexity of the subtracting elements 440 and the logic block 450 illustrate that the arbiter design in FIGS. 3 and 4 grows in complexity with the addition of more vectors. In other words, this design does not scale well with increasing numbers of vectors. Further, the delay that the arbiter 120 shown in FIGS. 3 and 4 introduces to find the next queue Y is equal to the delay associated with the vector arbiters, plus a delay associated with the subtracting elements, plus a delay associated with the logic block. The subtracting elements (e.g., 330) and the logic block (e.g., 340) may contribute significantly to the overall delay associated with the arbiter 120.

Accordingly, there exists a need for systems and methods for arbitrating across mutually exclusive vectors (e.g., destination queues) that scale well with increasing numbers of vectors and that minimize delay associated with the arbitration.

SUMMARY OF THE INVENTION

Systems and methods, consistent with principles of the invention, address this and other needs by combining mutually exclusive vectors into a combination vector, and performing arbitration on all vectors. The combination vector yields the next resource to service, which may be compared with each of the arbitration results from the mutually exclusive vectors to identify a destination for data in the next resource.

In accordance with the purpose of the invention as embodied and broadly described herein, an arbiter for performing arbitration may include combination logic configured to logically combine a plurality of mutually exclusive vectors into a combination vector, and also includes a plurality of vector arbiters. Each of the vector arbiters may be configured to arbitrate on one of the mutually exclusive vectors to develop a mutually exclusive vector result. A combination arbiter may be configured to arbitrate on the combination vector to develop a combination vector result. The arbiter also may include a plurality of comparison elements. Each of the comparison elements may be configured to compare one of the mutually exclusive vector results with the combination vector result.

In another implementation consistent with principles of the invention, a method of performing arbitration may include combining a plurality of mutually exclusive vectors into a combination vector and performing arbitration on each of the mutually exclusive vectors and the combination vector. A next resource to service may be identified based on an arbitration result for the combination vector. The method may also include comparing the arbitration result for the combination vector with arbitration results for the plurality of mutually exclusive vectors, and determining a destination of the next resource based on the comparisons.

In a further implementation consistent with principles of the invention, a network device may include a plurality of source resources and a plurality of destination resources. The network device may include an arbiter block coupled between the plurality of source resources and the plurality of destination resources. The arbiter block may include combination logic configured to logically combine a plurality of destination vectors that correspond to the plurality of destination resources into a combination vector, each of the plurality of vectors indicating which of the plurality of source resources contain data destined for a corresponding one of the destination resources. The arbiter block also may include a plurality of arbiters, each of the plurality of arbiters being configured to perform arbitration on one of the destination vectors or the combination vector to determine a position of a next source resource to service for the destination vector or the combination vector. The arbiter block also may include a plurality of comparison elements, each of the plurality of comparison elements being configured to compare a next source resource to service for a destination vector with a next source resource to service for the combination vector.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with principles of the invention provide logic to combine mutually exclusive vectors associated with destination queues into a combination vector and perform arbitration on all of the vectors. The combination vector yields the next queue among a plurality of queues to be serviced. The next queue to be serviced may be compared with each of the arbitration results from the mutually exclusive vectors to identify a destination for the data in the next queue.

EXEMPLARY ARBITER CONFIGURATION

Figure 1:
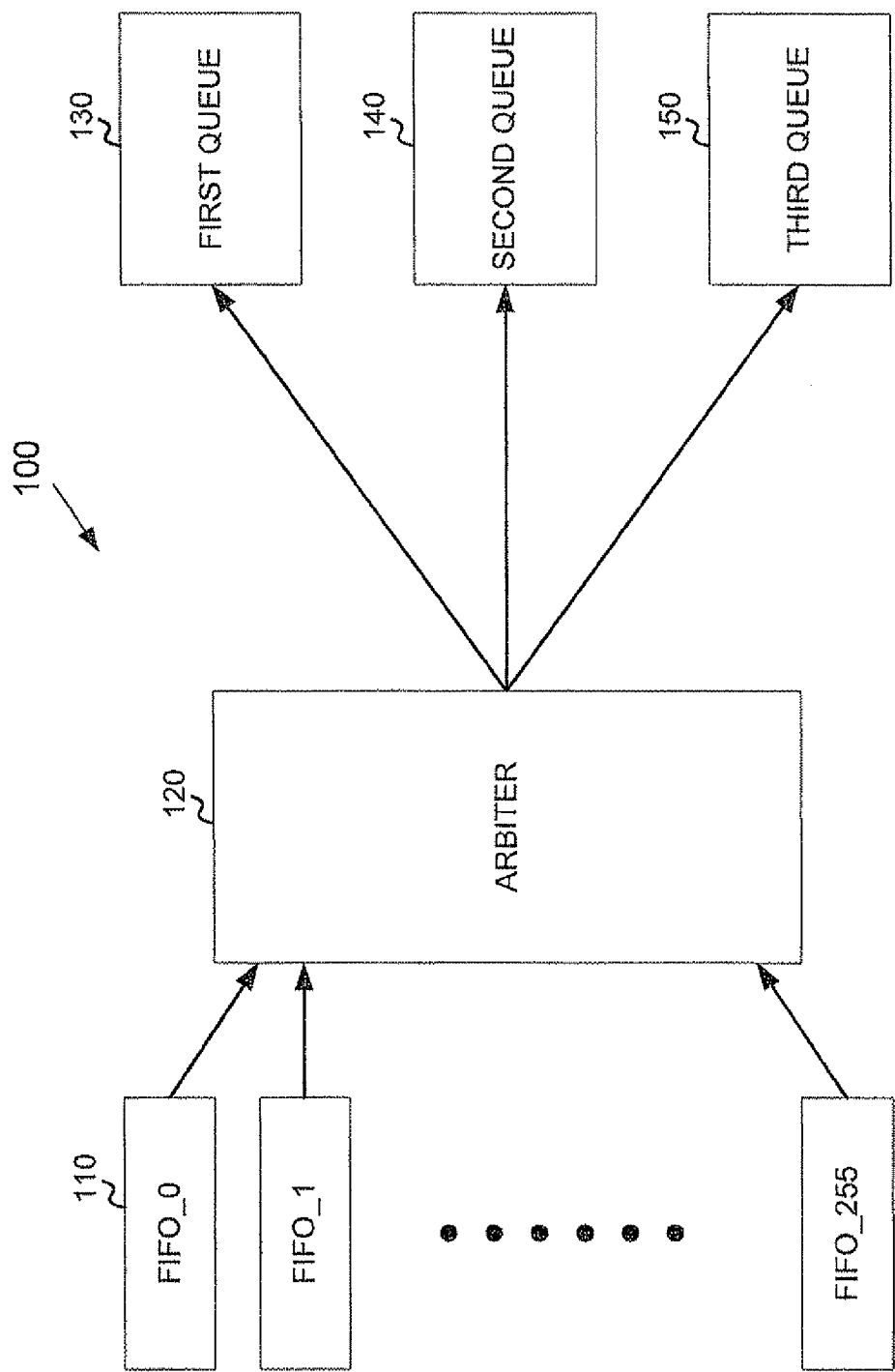
FIG. 1 is a diagram of an arbitration subsystem that routes data to a number of different queues.
Figure 2:
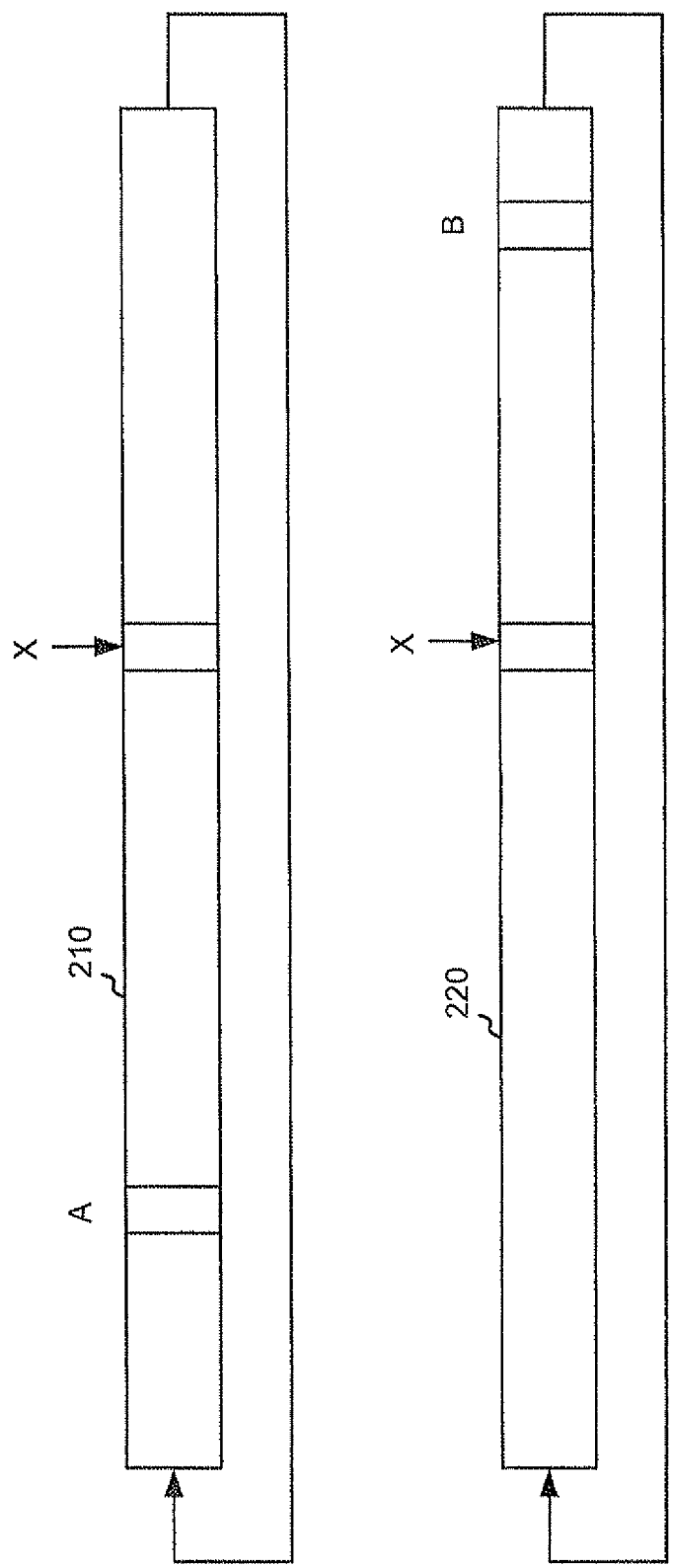
FIG. 2 is a diagram of two mutually exclusive vectors used to route data after arbitration.
Figure 3:
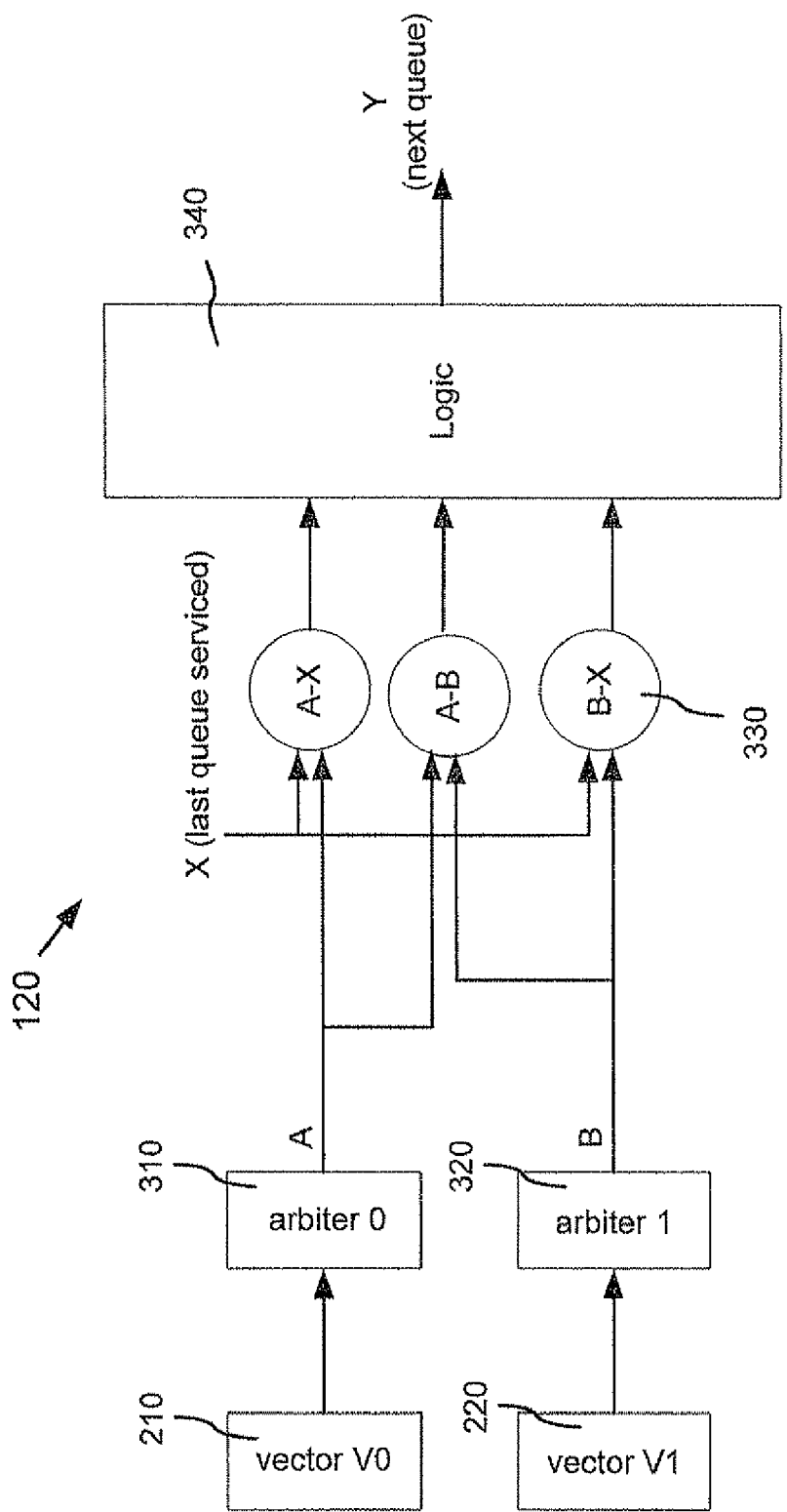
FIG. 3 is an implementation of an arbiter that performs round robin arbitration on two mutually exclusive vectors.
Figure 4:
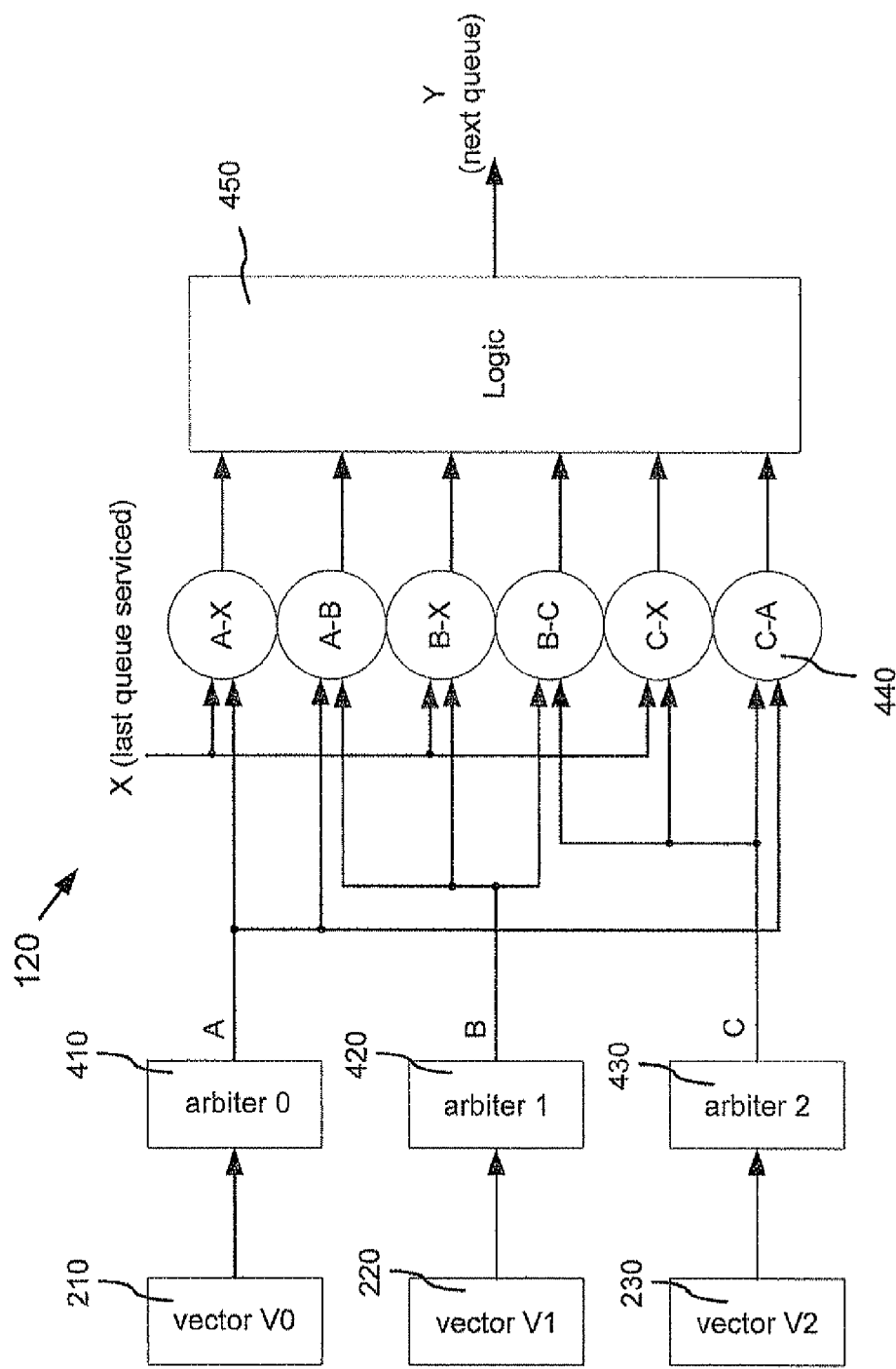
FIG. 4 is an implementation of an arbiter that performs round robin arbitration on three mutually exclusive vectors.
Figure 5:
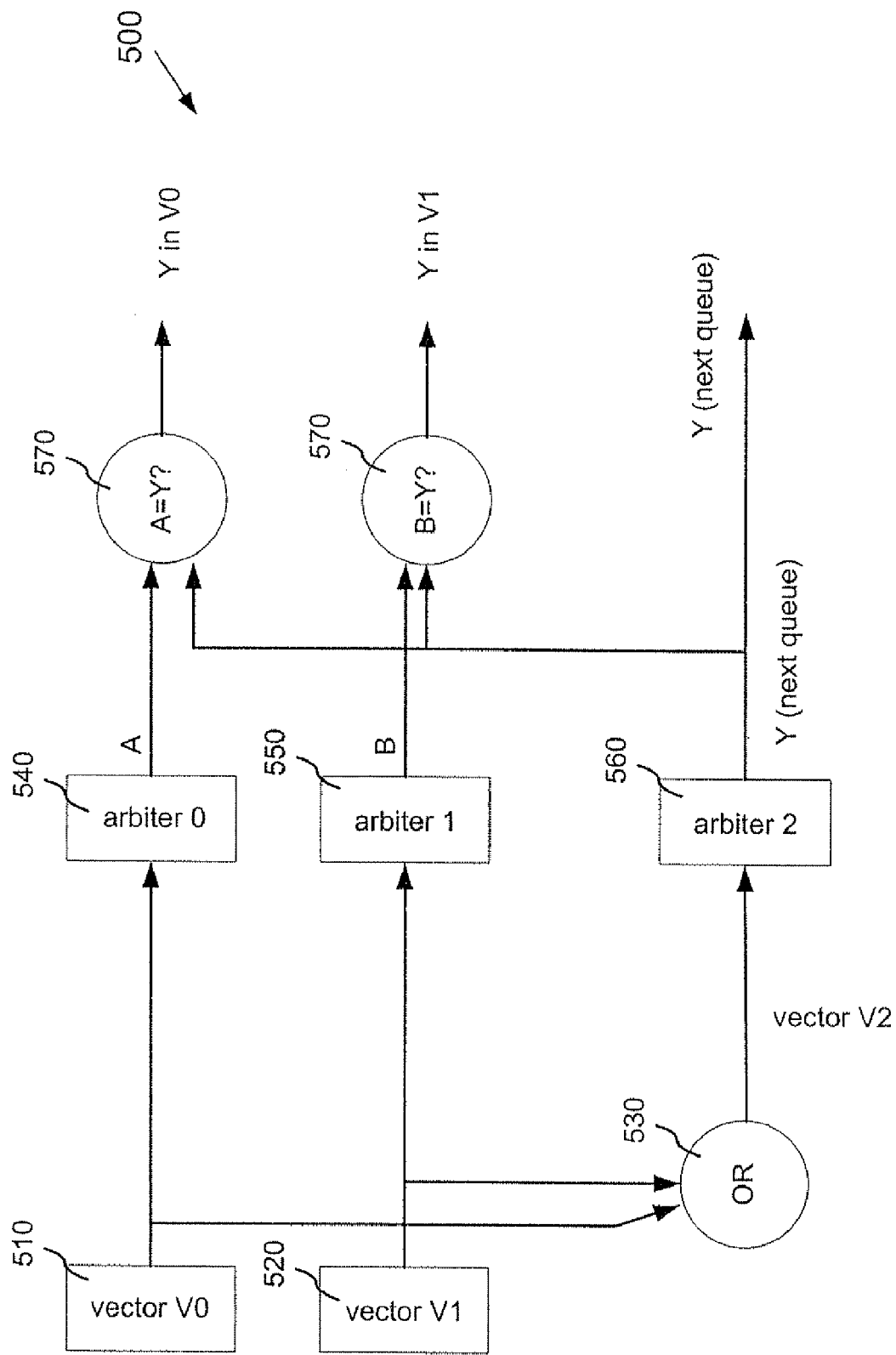
FIG. 5 is an exemplary diagram of an arbiter that performs arbitration on two mutually exclusive vectors according to an implementation consistent with principles of the invention.

FIG. 5 is an exemplary diagram of an arbiter 500 that performs arbitration on two mutually exclusive vectors according to an implementation consistent with principles of the invention. Arbiter 500 may be used within any type of device, including a network device, such as a router. When used in a network device, arbiter 500 may be used in place of arbiter 120 in FIG. 1 to route data to two destination queues (e.g., queues 130 and 140).

The arbiter 500 may include one or more storage elements 510 and 520, combination logic 530, vector arbiters 540-560, and comparison elements 570. The storage elements 510 and 520 may include one or more buffers or registers configured to store mutually exclusive vectors V0 and V1. As explained above, each bit in a particular mutually exclusive vector V0 or V1 corresponds to a different FIFO queue (e.g., FIFO queue 110), and may be set to "1" if there is data waiting in that particular FIFO queue 110. In an alternative implementation consistent with principles of the invention, the storage elements 510 and 520 may correspond to the FIFO queues 110, and the vectors V0 and V1 may correspond to different bit positions of data across the FIFO queues 110. Other configurations are possible for the storage devices 510 and 520, as long as such devices are configured to store vectors one bit wide by N bits long, where N is the number of FIFO queues 110 (e.g., 256), so that the vectors may be acted upon by the vector arbiters 540 and 550.

The combination logic 530 may be coupled to the storage elements 510 and 520 and to the arbiter 560. The combination logic 530 may be configured to logically combine vectors V0 and V1 to obtain a combined vector V2. In one implementation, the combination vector V2 is not stored in a storage element; however, the combination vector V2 may be temporarily stored or "registered" in other implementations. In an implementation consistent with principles of the invention, the combination logic 530 may include logic to perform a bit-wise logical OR operation on vectors V0 and V1. Performing an OR on mutually exclusive vectors V0 and V1 causes the combination vector V2 to represent all available data in the FIFO queues 110. In one implementation consistent with principles of the invention, storage for the combination vector V2 may be incorporated into the combination logic 530 by, for example, clocking the vectors V0 and V1 into or out of the combination logic 530, possibly using a register.

Vector arbiters 540-560 may be configured to perform arbitration on the respective vectors V0-V2. Vector arbiters 540-560 may be configured to perform round-robin arbitration on each vector V0-V2 in an implementation consistent with principles of the invention. Other types of arbitration (e.g., linear or daisy-chain) are possible. The arbiter 540 outputs the position of the next available queue in mutually exclusive vector V0, which is denoted by A. The arbiter 550 outputs the position of the next available queue in mutually exclusive vector V1, which is denoted by B. The arbiter 560 outputs the position Y of the next available queue in combination vector V2, which is the next queue to be serviced.

The comparison elements 570 are respectively configured to compare the position Y in vector V2 with the positions A and B in vectors V0 and V1. The comparison elements 570 may include digital comparators in an implementation consistent with principles of the invention. Because the vectors V0 and V1 are mutually exclusive, only one of the outputs of the comparison elements 570 will be true. If A=Y, then Y is in the vector V0, and, for example, the arbiter 500 may service the Yth FIFO queue 110 and output data from a location therein to the first queue 130. Alternatively, if B=Y, then Y is in the vector V1, and, for example, the arbiter 500 may service the Yth FIFO queue 110 and output the data therein to the second queue 140.

Figure 6:
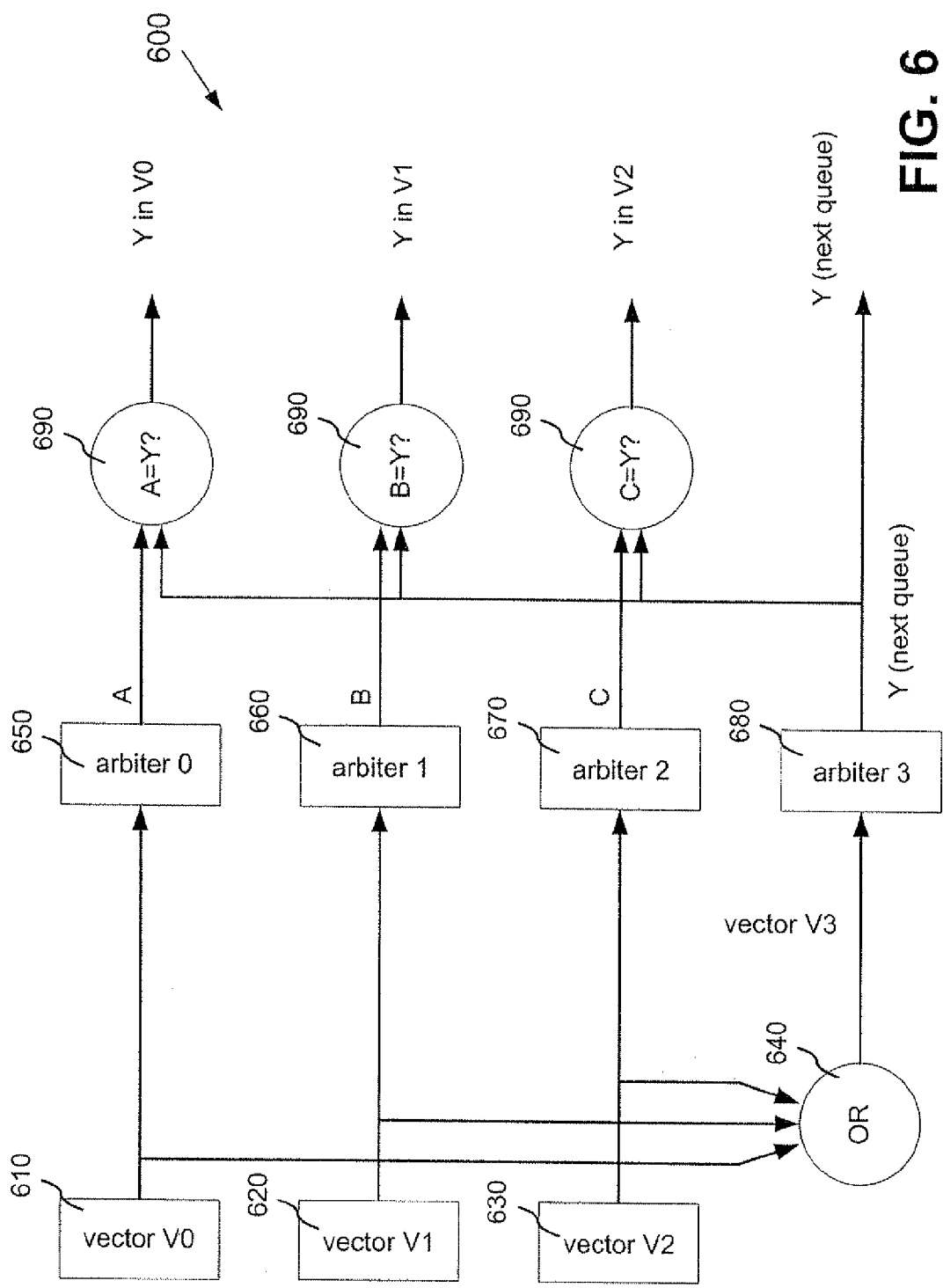
FIG. 6 is an exemplary diagram an arbiter that performs arbitration on three mutually exclusive vectors according to another implementation consistent with principles of the invention.

FIG. 6 is an exemplary diagram of an arbiter 600 that performs arbitration on three mutually exclusive vectors according to another implementation consistent with principles of the invention. The arbiter 600 may be used in place of arbiter 120 in FIG. 1 to route data among a plurality of destination queues (e.g., queues 130, 140, and 150).

The arbiter 600 may include one or more storage elements 610-630, combination logic 640, vector arbiters 650-680, and comparison elements 690. The above elements in FIG. 6 operate similarly to the above-described corresponding elements in FIG. 5, and will not be further described, with the exception of combination logic 640, which may perform a logical OR on three vectors V0-V2. Relative to the arbiter 500 in FIG. 5, the arbiter 600 includes only one additional storage element 630, vector arbiter 670, and comparison element 690. Hence, the arbiter design in FIGS. 5 and 6 scales well (i.e., does not require much additional hardware) with increasing numbers of mutually exclusive vectors. Further, the delay that the arbiters shown in FIGS. 5 and 6 introduce equals only the delay associated with the vector arbiters, plus a comparison delay. The combination logic 640 and comparison elements 690, for example, do not contribute significantly to the overall delay associated with the arbiter 600. For example, any comparison delay may be hidden by pipelining, as will be appreciated by those skilled in the art.

EXEMPLARY ARBITER PROCESSING

Figure 7:
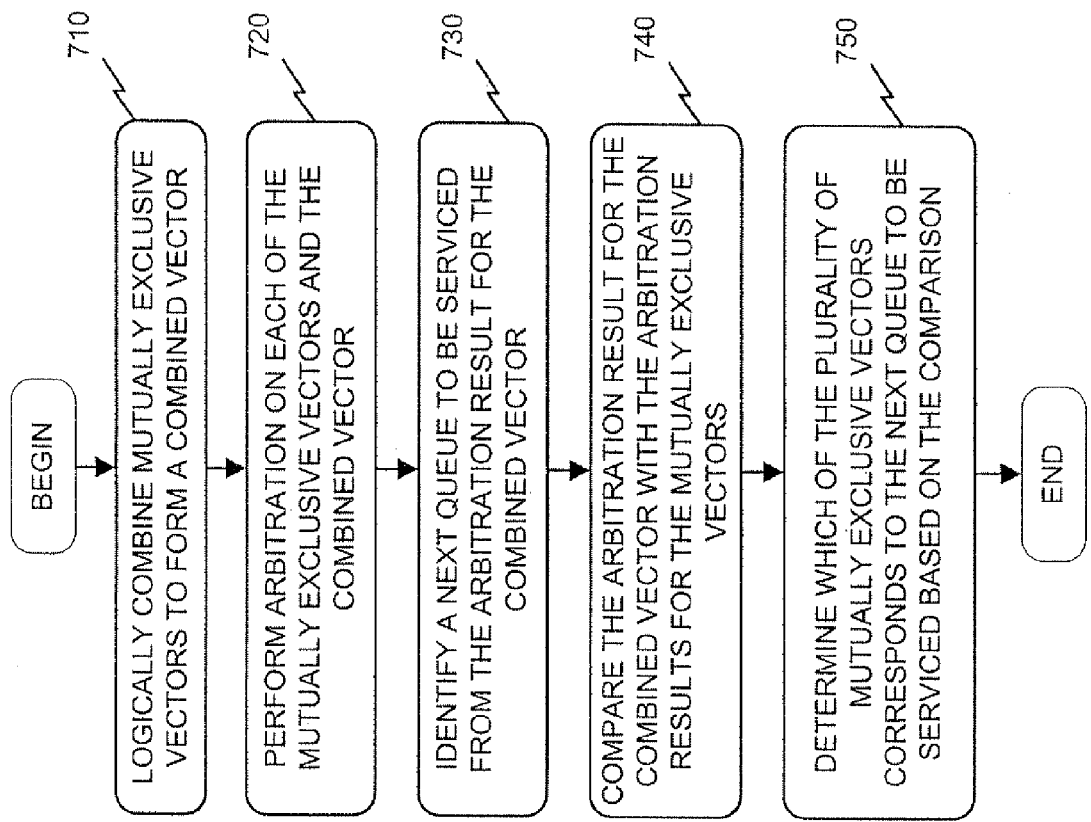
FIG. 7 is a flowchart of exemplary processing of a plurality of mutually exclusive vectors by the arbiter of FIG. 5 or 6 according to an implementation consistent with principles of the invention.

FIG. 7 is a flowchart of exemplary processing of a plurality of mutually exclusive vectors by an arbiter, such as arbiter 500 or 600, according to an implementation consistent with principles of the invention. Although the processing applies to both arbiters 500 and 600, for ease of explanation the processing will be described with respect to arbiter 500 only. Processing may begin with combination logic 530 logically combining the mutually exclusive vectors V0 and V1 to form the combined vector V2 [act 710]. Logically OR-ing the two vectors V0 and V1 may produce a combination (i.e., union) vector V2 that represents all FIFO queues 110 containing data ready for servicing.

Vector arbiters 540-560 may then perform arbitration on each of the vectors V0-V2, respectively [act 720]. According to one implementation consistent with principles of the invention, the arbiters 540-560 may each perform round-robin arbitration in a manner known to those skilled in the art to produce position A in vector V0, position B in vector V1, and position Y in the combination vector V2. Position A corresponds to, for example, the next FIFO queue 110 that contains data destined for, e.g., first queue 130. Position B corresponds to, for example, the next FIFO queue 110 that contains data destined for, e.g., second queue 140. Position Y corresponds to, for example, the next FIFO queue 110 that contains data ready for servicing [act 730].

The comparison elements 570 may compare the position Y with the positions A and B [act 740]. According to one implementation consistent with principles of the invention, the comparison elements 570 may each perform digital comparison in a manner known to those skilled in the art to produce a true result when the two compared positions are equal. If A=Y, the arbiter 500 determines that the data in the Yth FIFO queue 110 should be sent to the queue corresponding to vector V0, for example, first queue 130 [act 750]. Alternatively, if B=Y, the arbiter 500 determines that the data in the Yth FIFO queue 110 should be sent to the queue corresponding to vector V1, for example, second queue 140. Although not shown in FIG. 7, a final act of the arbiter 500 may be sending the data in the Yth queue to the output queue that corresponds to the vector from which the Yth queue was selected.

CONCLUSION

Methods and systems consistent with the principles of the invention may arbitrate among a number of queues, for example in a round-robin manner, but the destination of packets in these queues may vary according to, for example, packet size. Implementations consistent with the principles of the invention may determine the next queue to be serviced by a round-robin scheme. The destination of the data in that next queue may also be determined based on its size.

The foregoing description of preferred embodiments of principles of the invention provides illustration and description, but is not intended to be exhaustive or to limit the invention to the precise form disclosed. Modifications and variations are possible in light of the above teachings or may be acquired from practice of the invention. For example, although one logic convention (e.g., TRUE=1) and one type of logical combination element (e.g., an OR element) have been discussed, other types of conventions and gates are possible that have the same or similar functionality (e.g., TRUE=0 and an AND element). Further, although the vectors herein have been described as being mutually exclusive, other types of vectors (i.e., not mutually exclusive) may be used if the combination logic is modified accordingly. Also, some or all of the elements in FIGS. 5 and 6 may be implemented by a single integrated circuit, such as a gate array. Also, although the acts illustrated in FIG. 7 and the other figures are described sequentially, any non-dependent acts may be performed in any order or in parallel.

No element, act, or instruction used in the description of the present invention should be construed as critical or essential unless explicitly described as such. Also, as used herein, the article "a" is intended to include one or more items. Where only one item is intended, the term "one" or similar language is used. The scope of the invention is defined by the claims and their equivalents.

What is claimed is:

1. An arbiter for performing arbitration, comprising:

combination logic configured to logically combine a plurality of mutually exclusive vectors into a combination vector;

a plurality of vector arbiters, each configured to arbitrate on one of the mutually exclusive vectors to develop a mutually exclusive vector result;

a combination arbiter configured to arbitrate on the combination vector to develop a combination vector result; and a plurality of comparison elements, each configured to compare one of the mutually exclusive vector results with the combination vector result.

2. The arbiter of claim 1, wherein the combination logic includes:

logic configured to perform a logical OR operation on the plurality of mutually exclusive vectors.

3. The arbiter of claim 1, wherein each of the plurality of vector arbiters and the combination arbiter are configured to perform round-robin arbitration.

4. The arbiter of claim 1, wherein the combined vector results corresponds to a next resource to service.

5. The arbiter of claim 4, wherein when one of the comparison elements indicates that the mutually exclusive vector result matches the combination vector result, the next resource to be serviced corresponds to the mutually exclusive vector result.

6. A method of performing arbitration, comprising:

combining a plurality of mutually exclusive vectors into a combination vector;

performing arbitration on each of the mutually exclusive vectors and the combination vector;

identifying a next resource to service based on an arbitration result for the combination vector;

comparing the arbitration result for the combination vector with arbitration results for the plurality of mutually exclusive vectors; and determining a destination of the next resource based on the comparisons.

7. The method of claim 6, wherein the combining includes:

performing a bitwise OR operation on the plurality of mutually exclusive vectors.

8. The method of claim 6, wherein the performing includes:

performing round-robin arbitration.

9. The method of claim 6, wherein said identifying includes:

using a result returned as the arbitration result for the combination vector as an indication of the next result to service.

10. The method of claim 6, wherein the comparing includes:

checking whether the arbitration result for the combination vector matches the arbitration results for the plurality of mutually exclusive vectors.

11. The method of claim 10, wherein said determining includes:

using a destination associated with the next resource to be serviced as the destination that corresponds to the mutually exclusive vector whose arbitration result equals the arbitration result for the combination vector.

12. The method of claim 6, further comprising:

sending data from the next resource to service to a destination of the next resource to service.

13. A system for performing arbitration, comprising:

means for combining a plurality of mutually exclusive vectors into a combination vector;

means for performing arbitration on each of the mutually exclusive vectors and the combination vector; and means for comparing an arbitration result for the combination vector with arbitration results for the plurality of mutually exclusive vectors.

14. The system of claim 13, further comprising:

means for storing the plurality of mutually exclusive vectors.

15. A network device, comprising:

a plurality of source resources;

a plurality of destination resources; and an arbiter block coupled between the plurality of source resources and the plurality of destination resources, the arbiter block including:

combination logic configured to logically combine a plurality of destination vectors that correspond to the plurality of destination resources into a combination vector, each of the plurality of vectors indicating which of the plurality of source resources contain data destined for a corresponding one of the destination resources, a plurality of arbiters, each of the plurality of arbiters being configured to perform arbitration on one of the destination vectors or the combination vector to determine a position of a next source resource to be serviced for the destination vector or the combination vector, and a plurality of comparison elements, each of the plurality of comparison elements being configured to compare a next source resource to service for a destination vector with a next source resources to be serviced for the combination vector.

16. The network device of claim 15, wherein the plurality of destination resources includes two destination resources, wherein the plurality of destination vectors includes two destination vectors, wherein the plurality of arbiters includes three arbiters, and wherein the plurality of comparison elements includes two comparison elements.

17. The network device of claim 15, wherein the plurality of destination resources includes X destination resources, wherein the plurality of destination vectors includes X destination vectors, wherein the plurality of arbiters includes (X+1) arbiters, and wherein the plurality of comparison elements includes X comparison elements, where X is an integer greater than or equal to two.

18. An arbiter for performing arbitration among a plurality of resources and sending data to a plurality of mutually exclusive destinations, comprising:

at least one storage device configured to store a plurality of mutually exclusive vectors that correspond to the plurality of mutually exclusive destinations, each of the plurality of mutually exclusive vectors indicating which of the plurality of resources contain data destined for a corresponding one of the destinations;

combination logic configured to logically combine the plurality of mutually exclusive vectors into a combination vector;

a plurality of vector arbiters, each of the plurality of vector arbiters being configured to perform arbitration on one of the mutually exclusive vectors or the combination vector to determine a position of a next resource to be serviced for the vector; and a plurality of comparison elements, each of the plurality of comparison elements being configured to compare the position of the next resource for the mutually exclusive vector with the position of the next resource for the combination vector.

19. A method of performing arbitration, comprising:

choosing a next queue to be serviced in a round robin manner among a plurality of queues waiting to be serviced and containing data; and determining a destination for the data in the next queue to be serviced from among a plurality of mutually exclusive destinations based on a characteristic of the data in the next queue to be serviced, where the characteristic of the data in the next queue to be serviced includes a size of the data, and where the plurality of mutually exclusive destinations includes two mutually exclusive destinations that correspond to two mutually exclusive data sizes.

20. The method of claim 19, wherein the plurality of mutually exclusive destinations includes three mutually exclusive destinations that correspond to three mutually exclusive data sizes.

* * * * *